(12) United States Patent
Panchomarthi et al.

(10) Patent No.: US 11,449,352 B2
(45) Date of Patent: Sep. 20, 2022

(54) SYSTEMS AND METHODS FOR CONVERTING RECORD FORMATS

(71) Applicant: JPMORGAN CHASE BANK, N.A., New York, NY (US)

(72) Inventors: Sangameswara Rao Panchomarthi, Bear, DE (US); Jay Cornell, New York, NY (US); Souma Suvra Ghosh, Wilmington, DE (US); Prashant Paranjape, New York, NY (US); Sakthi Muthuswamy, New York, NY (US); Lakshminarayana Bayapareddy, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 279 days.

(21) Appl. No.: 16/866,860

(22) Filed: May 5, 2020

(65) Prior Publication Data

US 2021/0349743 A1   Nov. 11, 2021

(51) Int. Cl.
| | |
|---|---|
| *G06F 9/455* | (2018.01) |
| *G06F 9/445* | (2018.01) |
| *G06F 9/54* | (2006.01) |
| *G06F 16/2455* | (2019.01) |
| *H04L 9/08* | (2006.01) |
| *G06F 16/21* | (2019.01) |

(52) U.S. Cl.
CPC ...... *G06F 9/45504* (2013.01); *G06F 9/44505* (2013.01); *G06F 9/45558* (2013.01); *G06F 9/542* (2013.01); *G06F 16/211* (2019.01); *G06F 16/24568* (2019.01); *H04L 9/0819* (2013.01); *H04L 9/0861* (2013.01); *G06F 2009/45587* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 10,936,744 B1 * | 3/2021 | Trepetin | H04L 9/0861 |
| 2019/0103963 A1 * | 4/2019 | He | H04L 9/0861 |

* cited by examiner

*Primary Examiner* — Charlie Sun
(74) *Attorney, Agent, or Firm* — Greenberg Traurig LLP (57) ABSTRACT

Systems and methods for streaming event records in one record format to a target system by converting the event record into a new format that is compatible with the target system. A conversion file may be used to translate the contents of the event record into an updated event record that may include schema or topics. In addition, an authentication server is used to obtain an authentication token and an encryption server may be used to manage the encryption of event records as they are streamed into a target computing system. Some embodiments involve streaming mainframe event records into a Kafka-based server.

20 Claims, 5 Drawing Sheets

SYSTEMS AND METHODS FOR CONVERTING RECORD FORMATS

BACKGROUND OF THE INVENTION

1. Field of the Invention

Embodiments relate to systems and methods convert business event records having an initial format into a record having a target format.

2. Description of the Related Art

Event records may be embodied a variety of formats such as a fixed length format, variable length format, formats that require schema, formats with predefined fields, etc. In a production environment, users who need to access the information within a specific system may need to have a knowledge of the message format for that specific system or proper syntax for structuring database queries for each type of database that contains the records. For example, a mainframe system may store records needed by application developers who are unfamiliar with systems, databases and Extended Binary Coded Decimal Interchange Code (EBCDIC) character set encoding used on mainframe systems.

SUMMARY OF THE INVENTION

The present disclosure relates to streaming event records from an initial system to a different, target system. In some embodiments, the initial system is a mainframe database or mainframe application that stores or generates event records in fixed length formats with mainframe specific numeric field format (e.g., EBCDIC encoding). The target system may be a distributed system such as, for example, a Kafka Streaming System, where event records are formatted using schema, topics, and other field structures that might not be present in the initial system.

By automatically transferring event records into a more desirable target record format as described herein, software developers that wish to use records in the target system format do not need to develop their own code or scripts to process event records. In other words, the present disclosure provides minimal understanding of a source data format. Embodiments further provide simple configuration based field mapping from source to target format, standardized conversion of records, simplified deployment of record conversion, and a framework that is easy to modify or update.

In some embodiments, a virtual machine is executed to perform various operations with regard to streaming event records of an initial system into a target system. The virtual machine may convert the initial event record into an updated record for a target system. A conversion file may be used to create system fields, schema, and/or topics for the updated event record.

The virtual machine may communicate with an authentication server to obtain an authentication token. Depending on whether an event record contains confidential or private information, the virtual machine may instantiate a key management service in an encryption server to manage encryption keys. The authentication token may be used to obtain the encryption key. The virtual machine may encrypt the updated event record.

The virtual machine may establish a network connection with the target system. The virtual machine may stream the updated event record to the target event record. This may involve presenting the authentication token. The updated event record may be decrypted by submitting a request to the encryption server to obtain the encryption key.

In some embodiments, the process of streaming event records to a target system is performed in response to an event related to a business work-flow. The event causes the generation or storage of an event record by the source system. The event record may or may not be written to an initial database. The event record is converted from an initial record format into a target record format according to embodiments. In some embodiments, the conversion involves encrypting the event record and then streaming it to the target system. A microservice may access the converted record from the target system in its own native format.

In some embodiments, a batch processing instruction causes a set of event records in the initial system to be streamed to the target system on a periodic basis. For example, during nighttime when system activity is low, a batch process instruction may identify a set of event records to automatically be updated and transmitted to the target system.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Exemplary embodiments will now be described in order to illustrate various features. The embodiments described herein are not intended to be limiting as to the scope, but rather are intended to provide examples of the components, use, and operation of the invention.

Figure 1:
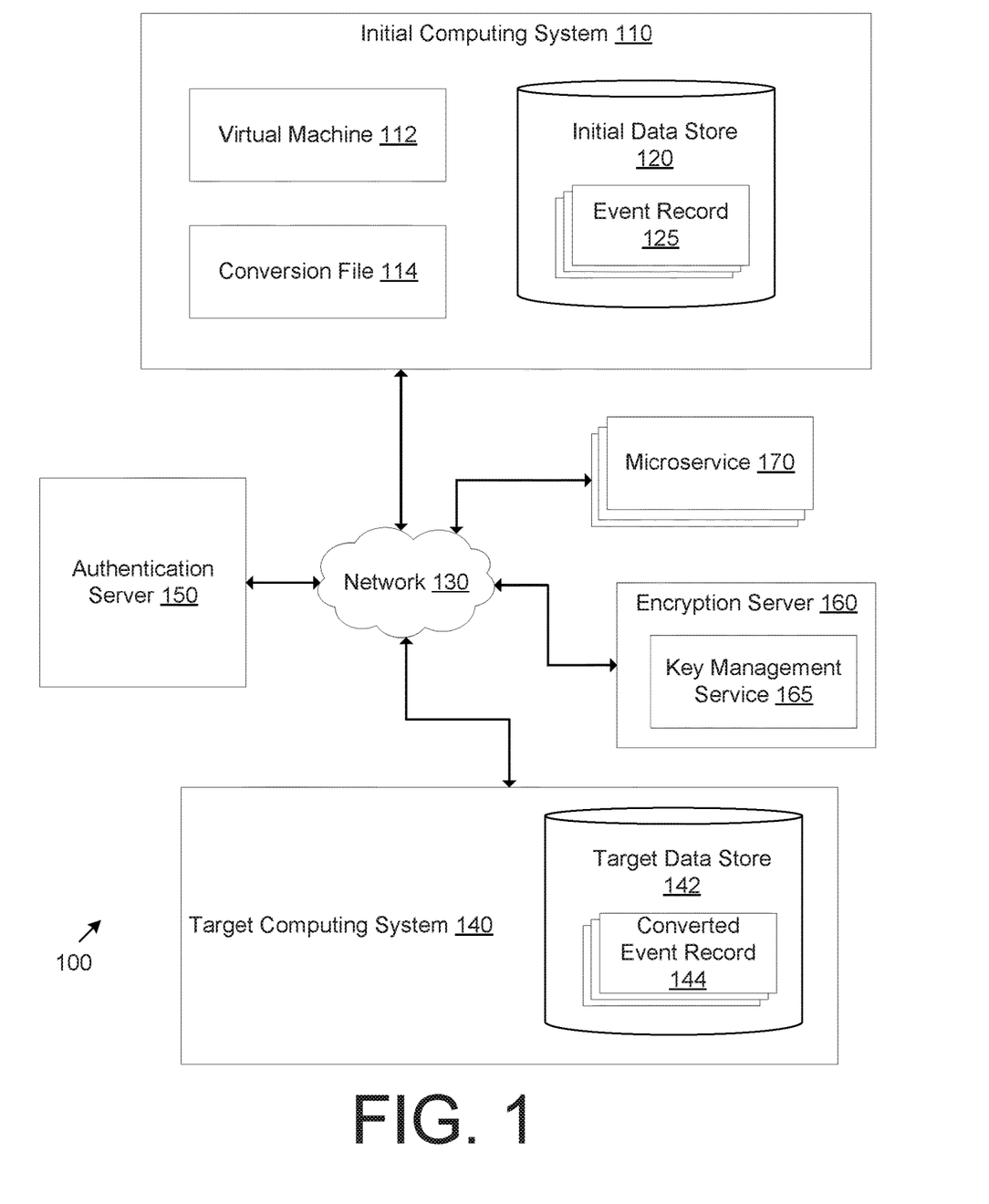
FIG. 1 is a drawing of a networked environment according to various embodiments.

FIG. 1 shows a networked environment 100 according to various embodiments. The networked environment 100 includes an initial computing system 110 that may execute application programs and execute virtual environments including, for example, a virtual machine 112. The initial computing system 110 may also access files such as, for example, a conversion file 114.

The initial computing system 110 may be an application server. The initial computing system 110 may be implemented as a server installation or any other system providing computing capability. Alternatively, the initial computing system 110 may employ a plurality of computing devices that may be arranged, for example, in one or more server banks or computer banks or other arrangements. Such computing devices may be located in a single installation or may be distributed among many different geographical locations. For example, the initial computing system 110 may include a plurality of computing devices that together may comprise a hosted computing resource, a grid computing resource and/or any other distributed computing arrangement. In some embodiments, the initial computing system 110 may correspond to an elastic computing resource where the allotted capacity of processing, network, storage, or other computing-related resources may vary over time. The initial computing system 110 may implement one or more virtual machines 112 that use the resources of the initial computing system 110.

The initial computing system 110 may be comprise an initial data store 120. The initial data store 120 may store one or more event records 125. The initial data store 120 may be a database. The initial computing system 110 may execute one or more database applications such that it functions as a database server that manages and provides access to the event records 125.

Event records 125 are records that may be dynamically generated in response to an event associated with a software or hardware application. For example, the swiping of a credit card may generate event data that causes an event record 125 to be generated. In this example, the event record 125 may include a timestamp, information about the credit card, information about the credit card account holder, a transaction amount, and other data related to the credit card transaction.

In some embodiments, event records 125 may store various pieces of customer information. For example, an event record may include banking account information such as, for example, account numbers, account type, balances, transaction data (e.g., debit credit, etc.), a payment history, account ownership status (e.g., joint account, relationship status, etc.), account level scores or account analytics (e.g., the probability of pay back, the probability that account will default, a forecast of account defaults, etc.), or other bank account information. Event records 125 may include customer account information such as, for example, a customer name, address, phone number, social security number, tax identifiers, customer identifiers, customer preferences. In some cases, the information contained in a event record 125 is publicly available while in other examples, the information may be private or confidential such that it should be subject to encryption.

The initial data store 120 may be a mainframe database and the initial computing system 110 maybe be implemented as one or more mainframe servers. In this embodiment, the event records 125 are formatted in a mainframe record format. For example, the event records may be organized in a fixed length format where each event record 125 is identical in size.

The initial computing system 110 may include a Customer Information Control System (CICS) that provides services to extend or replace an operating system that executes on the application server 110. For example, the initial computing system 110 may provide a CICS region to support mainframe-based applications to manage, process, manipulate, and/or provide access to event records 125. A CICS region may provide a platform to execute a virtual machine 112, such as, for example, a JVM.

Users developing applications that use the event records 125 as an input may need to first convert the event records 125 into a different record format. The present disclosure describes embodiments of automating the conversion of the event records 125 into a target record format to streamline and standardize application development.

The initial computing system 110 may connect with other components in the networked environment over a network 130. The network 130 may include networks such as the Internet, intranets, extranets, wide area networks (WANs), local area networks (LANs), wired networks, wireless networks, or other suitable networks, etc., or any combination of two or more such networks.

For example, applications executing on the initial computing system 110 may establish a communication link such as a channel, tunnel, socket, or other link to remote components. A communication link may be for example, a Transmission Control Protocol/Internet Protocol (TCP/IP) connection.

The networked environment 100 may further include a target computing system 140. The target computing system may be a database server. The target computing system 140 may comprise a target data store 142. The target data store 142 may be a database that stores records. The target data store 142 may be a desired data store that is better suited for application development compared to the initial data store 120.

In some embodiments, the target computing system 140 comprises a Kafka server. A Kafka server is an open-source stream processing software platform that stores records according to a Kafka format. This may include formats such as, for example, XML, JSON, or ASN.1, or Apache Avro. Kafka database formats may support extensible schema languages. The target computing system 140 may include a schema registry to allow applications to access various records residing in the target data store 142. However, event records 125 may need to be converted and streamed to the target computing system 140 before they are accessed by applications.

In some embodiments, the target data store 142 is a database that organizes records stored therein using topics. A topic may contain one or more messages, where a message comprises a key-value pair. In the context of Avro, the message key and/or the message value, may be serialized as Avro. A schema may define the structure of the Avro record format. A topic name may be independent and separate from a schema name. A schema registry may define the scope an extensibility of schemas. Within a Kafka server, topics and schemas may be associated with records residing in a Kafka database.

As shown in FIG. 1, the event records 125 may be automatically converted into a converted event record 144 that is a different record format compared to the record format of the event record 125. Thereafter, the converted event record(s) 144 may be streamed to the target computing system 140 and/or stored in the target data store 142. Users may develop applications that use the converted event records.

The networked environment 100 further includes an authentication server 150. An authentication server 150 may include an Active Directory Federation Service (ADFS) or other authentication service to permit access to other components in the networked environment 100. For example, the authentication server 150 may be configured to establish trust between two or more components within the networked environment 100. A user or software routine may submit an authentication request to the authentication server, where the authentication request includes parameters such as, for example, an authentication certificate, credentials, a function identifier, or other information used to authenticate the requesting entity. The authentication server 150 may maintain an authentication directory to authenticate the requesting party based on the parameters of the request. Based on the parameters provided by the requesting party, the authentication server 150 returns an authentication certificate to the requesting entity. An authentication certificate may be presented by an entity to other components in the networked environment 100 so that the other components may trust the entity.

The networked environment 100 further includes an encryption server 160. The encryption server 160 may execute a key management service 165. A key management service 165 may generate or otherwise manage key pairs that are used to encrypt and decrypt data within the networked environment 100. For example, key management service 165 may generate a key pair including a first encryption key and a second encryption key. The first encryption key may be provided to a requesting entity to encrypt data, where the encrypted data is transmitted to a second entity. The second entity may submit a request to the key management service 165 to decrypt the encrypted data using the first and second encryption keys.

The networked environment 100 further includes one or more microservices 170. A microservice 170 may include a routine, subroutine, application, program or other code that executes in the networked environment 100. A microservice may execute in the initial computing system 110, target computing system 140, or some other computing device in the networked environment 100. A microservice 170 may require the contents of a event record 125 as an input. For example, a microservice 170 may be a routine that evaluates whether a customer is approved for a loan. In this embodiment, the microservice 170 may require access to the customer's financial account information stored as one or more event records 125. As another example, a microservice 170 may be a routine that calculates a risk score that a customer may default or overdraft an account. In this embodiment, the microservice may require accessing a customer's credit card account and account balances to perform the risk calculation.

Software developers who create microservices 170 may require or prefer the event records 125 to be formatted and accessible according to the target format of the target computing system 140 instead of the format of the initial computing system 110. This may necessitate converting and streaming any a set of event records 125 to the target data store 142. Thus, embodiments of the present disclosure are directed to an automated process to converting and streaming any a set of event records 125 to the converted event records 142 in a uniform and standardized way, thereby freeing developers from the burden of handling event records 125 in an ad hoc manner.

Various embodiments are directed to a software program that executes in the initial computing system 110. The software program executes the virtual machine 112. The virtual machine may be, for example, a Java Virtual Machine (JVM). The virtual machine 112 may instantiate one or more Java instances to stream event records 125 to the target computing system 140. The virtual machine 112 may communicate with the authentication server 150 and the encryption server 160, as discussed in further detail below. In addition, the virtual machine may access event records 125 and update them according to a conversion file 114 as described in further detail below. The virtual machine 112 may then convert the event records 125 to comply with a format supported by the target computing system 140. The virtual machine 112 may establish a network connection (e.g., TCP/IP connection) with the target computing system 140 to stream converted event records 125 to the target computing system 140.

Figure 2:
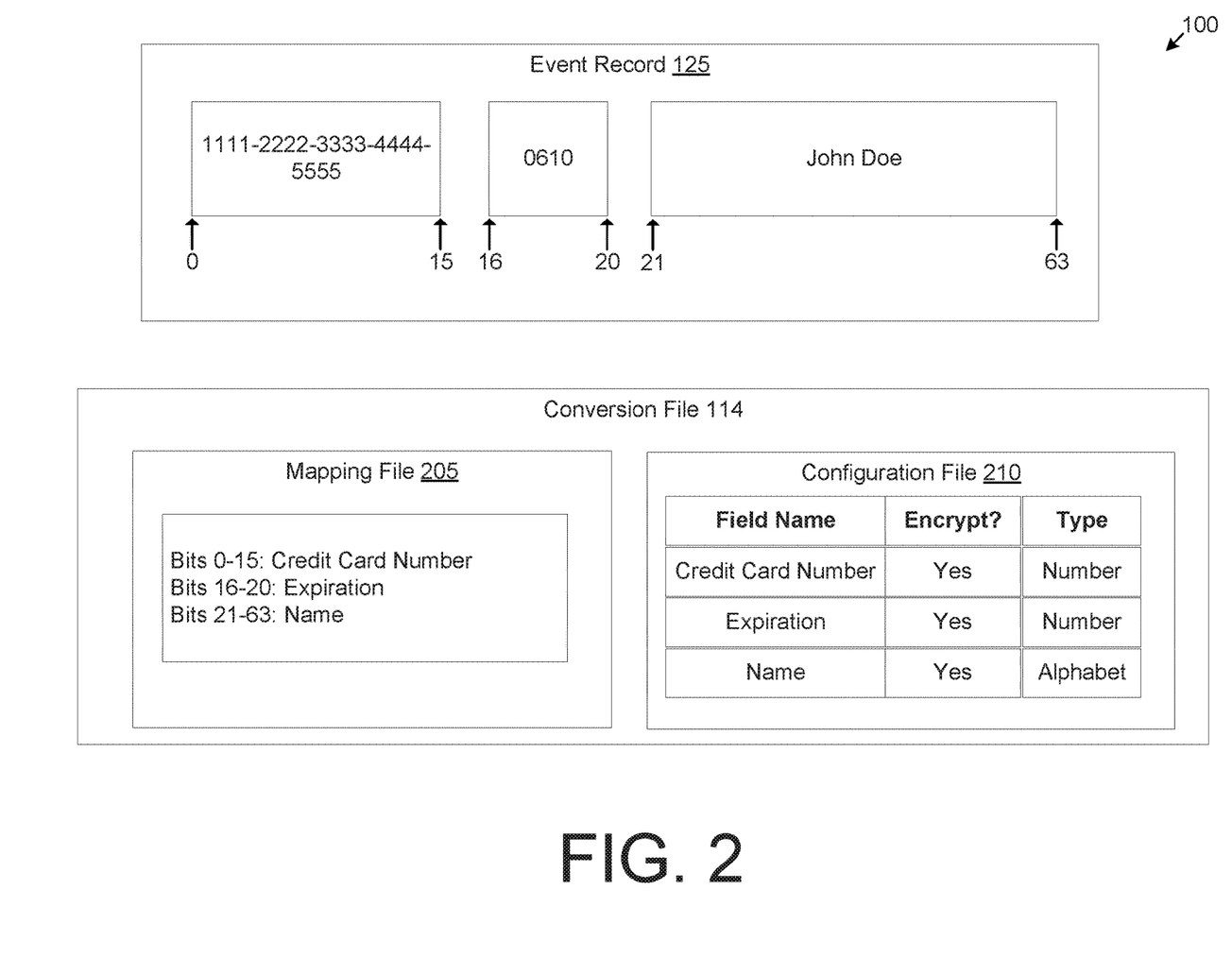
FIG. 2 is a diagram showing the conversion of an event record using a conversion file in a networked environment according to various embodiments.

FIG. 2 is a diagram showing the conversion of an event record 125 using a conversion file 114 in a networked environment 100 according to various embodiments. The example of the event record 125 shown in FIG. 2 may be a mainframe database record or may be an event record generated by a mainframe application. The event record 125 may have a fixed length such as, for example having a predetermined number of bits. The example of FIG. 2 shows the event record having 64 bytes ranging from byte 0 to byte 63. The format of the event record 125 may be defined such that bytes 0 to 15 contain a first piece of information (e.g., a credit card number), bytes 16 to 20 contain a second piece of information (e.g., a credit card expiration date), and bytes 21 to 63 contain a third piece of information (e.g., a credit card owner name).

FIG. 2 also shows a conversion file 114. The conversion file defines how to convert an event record 125 into a converted event record 144 having a format compatible or otherwise defined by the target computing system 140. The conversion file 114 may include one or more files such as, for example, a mapping file 205 and a configuration file 210. A mapping file 205 may define how to map bit/byte ranges in a record to a particular record fields. For example, bytes 0 to 15 map to a credit card number field, bytes 16 to 20 map to a credit card expiration date field, and bytes 21 to 63 map to a credit card owner name field. A configuration file 210 may specify how various fields and/or field values are to be handled by the target computing system 140. For example, the configuration file 210 may specify whether the values of a particular field or whether a particular type of record should be encrypted. The configuration file 210 may also specify the type of values a field may contain such as, for example, alphabetic, numeric, alphanumeric, etc. The configuration file 210 may also specify schema and/or topics for a particular an event record or the fields of a particular event record. The configuration file 210 and mapping file 205 work together to define how an event record 125 should be converted before it is streamed to a target computing system 140.

Figure 3:
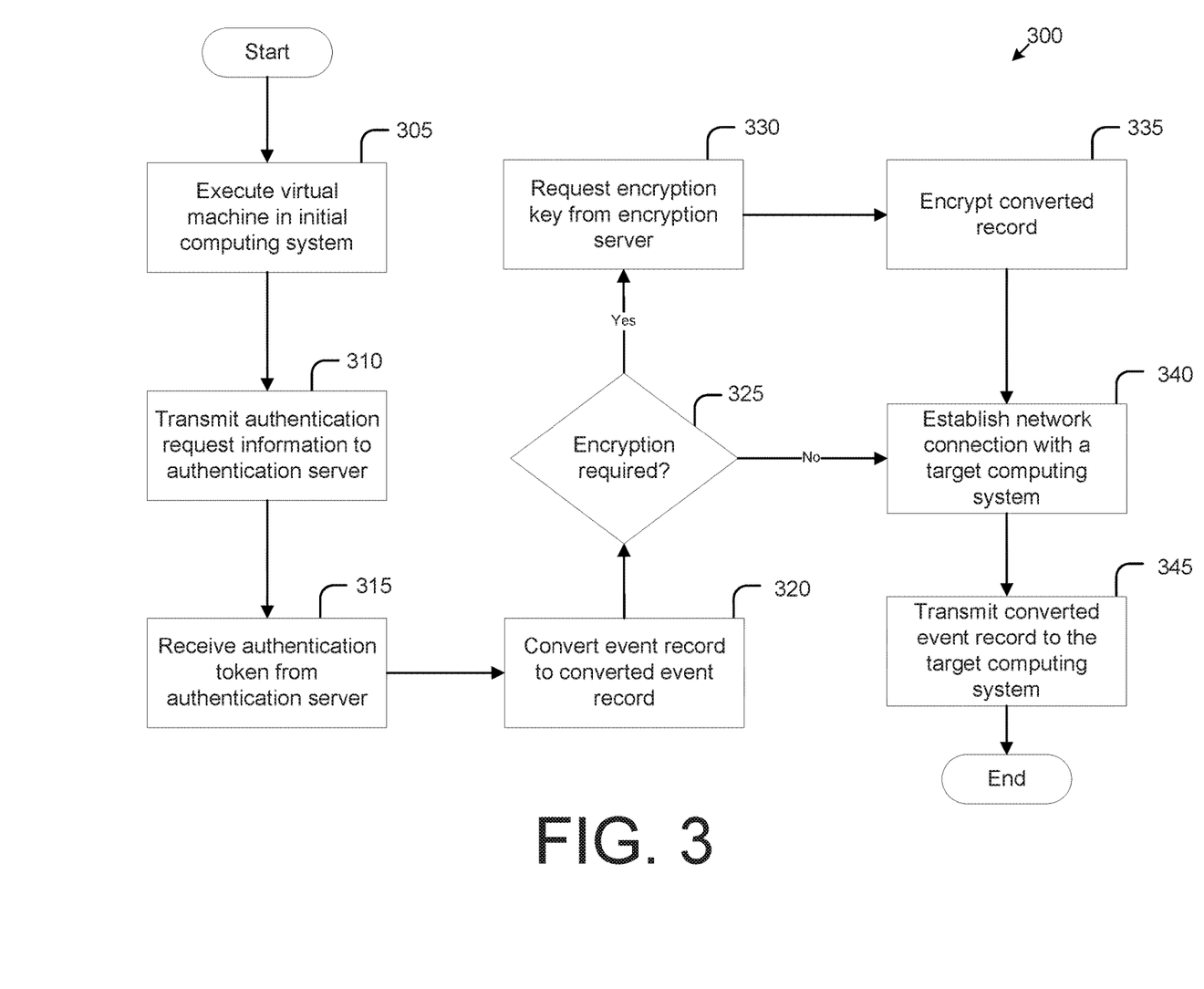
FIG. 3 is a flowchart illustrating an example of the functionality to stream an event record to a target system in a networked environment according to various embodiments.

FIG. 3 is a flowchart illustrating an example of the functionality to stream an event record to a target computing system in a networked environment according to various embodiments. It is understood that the flowchart of FIG. 3 provides an illustrative example of the many different types of functional arrangements that may be employed to implement the operation of the portion of an application server (e.g., the initial computing system 140 of FIG. 1) as described herein. The flowchart of FIG. 3 may also be viewed as depicting an example of a method 300 implemented in the networked environment 100 of FIG. 1 according to one or more embodiments.

At item 305, the application server may execute a virtual machine in the application server. A software application may instantiate a virtual machine such as, for example a JVM. The virtual machine may create a software environment to execute various routines for streaming event records from one computing system (e.g., the initial computing system 110 of FIG. 1) to a target computing system (e.g., the target computing system 140 of FIG. 1). The software application may execute in a CICS region and create a JVM within the CICS region of the application server.

At item 310, the application server may transmit an authentication request information to an authentication server. For example, a virtual machine may establish a connection with an authentication server to submit a request. The request may include authentication request information such as, for example, an authentication certificate, a function ID, or other information that identifies the virtual machine and/or the application server. The authentication server may use the authentication request information to generate an authentication token. For example, that authentication server may access a directory to determine whether the entity that submitted the authentication request is a trusted entity.

At item 315, the application server may receive an authentication token from authentication server. For example, the authentication server may transmit the authentication token to the virtual machine executing in the application server. The virtual machine may then store the authentication token to establish trust with other components within the networked environment.

At item 320, the application server may convert an event record to a converted event record. For example, a virtual machine may use a conversion file to extract field values from an event record and generate a converted event record using the extracted field values. The application server may also generate schema and topics defined by the conversion file. For example, schema and/or topics may be generated using the conversion file. The schema and/or topics may be written into the converted event record. The converted event record is generated by using the predefined schema as it is defined in the conversion file.

At item 325, the application server may check if the converted event record or any specific fields of the converted event record is to be encrypted. For example, the virtual machine may check the conversion file to determine whether to apply encryption to some or all of the converted event records.

At item 330, the application server may request an encryption key from the encryption server. For example, the virtual machine may submit a request to the encryption server for one or more encryption keys. This request may include an authentication token received from the authentication server. The encryption server may use the authentication token to confirm the identity of the first authentication server, virtual machine, or other software routine that submitted the request for the encryption key. The encryption server may generate a key pair including a first encryption key and second encryption key. The first encryption key may be transmitted from the encryption server to the application server while the second encryption key may be stored by the encryption server without it being shared.

The encryption server may manage an encryption key registry to track generated key pairs and encrypted data. The encryption server may receive subsequent requests to decrypt data. In response to requests to decrypt data the encryption server may provide a corresponding encryption key to authenticated entities that submit decryption requests.

In some embodiments, the application server may submit an instruction to the encryption server to execute a key management service. A key management service may be a software application responsible for generating the key pair.

At item 335, the application server may encrypt the converted event record. The first software application may use a received encryption key and apply it to a portion or to the entirety of the converted event record. This may be performed in accordance with parameters specified in the conversion file.

At item 340, the application server may establish a network connection with a target computing system. For example, the virtual machine may create a TCP/IP connection to the target computing system.

At item 345, the application server may transmit the converted event record to the target computing system. The application server may use an established connection to transfer the converted event record such that it is streamed to a target computing system. Upon streaming, the converted event record may be stored in a target data store of the target computing system and may be accessible to microservices and other software applications that interface with the target computing system.

In the event that the converted event record is encrypted, the converted event record may be decrypted by submitting a request to the encryption server for decryption. The entity submitting the decryption request may provide credentials (e.g., an authentication token) to obtain an encryption key to decrypt the converted event record.

Figure 4A:
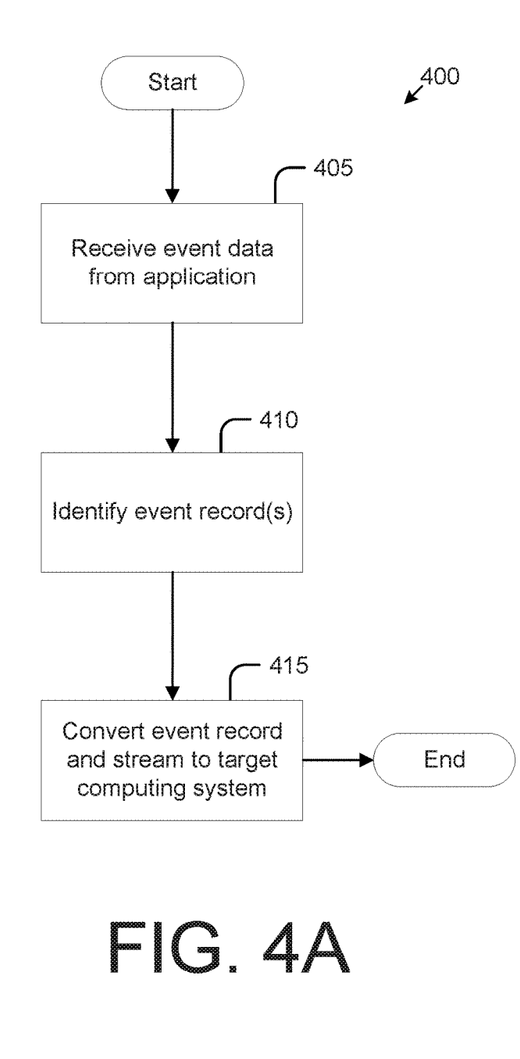
FIGS. 4A and 4B are flowcharts illustrating an example of the functionality to automatically stream event records in a networked environment according to various embodiments.

FIG. 4A is a flowchart illustrating an example of the functionality to automatically stream event records in a networked environment according to various embodiments. It is understood that the flowchart of FIG. 4A provides an illustrative example of the many different types of functional arrangements that may be employed to implement the operation of the portion of an application server (e.g., the initial computing system 110 of FIG. 1) as described herein. The flowchart of FIG. 4A may also be viewed as depicting an example of a method 400 implemented in the networked environment 100 of FIG. 1 according to one or more embodiments.

At item 405, the application server may receive event data generated by a software application. For example, software application may interface with an application or software program (e.g., a virtual machine) executing on the application server. In this respect the application server may listen or monitor for event data received from one or more applications. The application server may interface with a applications using, for example, an Application Programming Interface (API).

Event data may cause the generation of storage of an event record. The event record may include information about an event or may include the event data formatted as a record. Microservices executing in the networked environment may require access to the event record. For example, a microservice to generate a targeted advertisement for a new financial account or financial service for a pre-existing banking customer may require access to the customer's credit card account information. The customer's credit card account information may be stored within one or more event records. As explained below, event records may need to be converted to a target record format that is compatible with a microservice needing to access or use the contents of the event record.

At item 410, the application server may identify one or more event records. For example, the application server may communicate with the microservice to determine the identities of the event records needed by the microservice. The microservice may provide event record identifiers to the application server to identify any required event records.

At item 415, the application server may convert the event record(s) into converted event record(s) and stream them to a target computing system. For example, item 415 may represent operations, functionality, or steps described with respect to the flow chart of FIG. 3. For example, the identified event records may be converted to converted event records in a manner described with respect to item 320 and streamed to the target computing system in a manner described with respect to item 345.

Figure 4B:
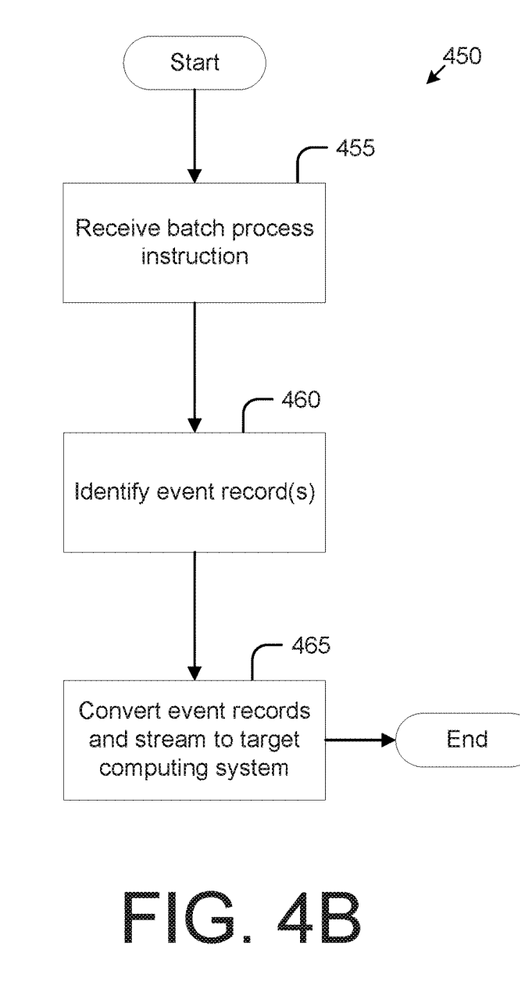

FIG. 4B is a flowchart illustrating an example of the functionality to automatically stream event records in a networked environment according to various embodiments. It is understood that the flowchart of FIG. 4B provides an illustrative example of the many different types of functional arrangements that may be employed to implement the operation of the portion of an application server (e.g., the initial computing system 110 of FIG. 1) as described herein. The flowchart of FIG. 4B may also be viewed as depicting an example of a method 450 implemented in the networked environment 100 of FIG. 1 according to one or more embodiments.

At item 455, the application server receives a batch process instruction. The batch process instruction may be part of a batch process file that identifies a set of event records to be converted and streamed to a target computing system. In some embodiments, the batch process instruction identifies a time or period for when to perform batch processing of converting and streaming event records. For example, a batch process file may include an instruction to perform batch processing on a predetermined range of event record identifiers at a particular time of day.

At item 460, the application server may identify the event records. For example, the application server may identify the locations of the event records within a set of event records that are to be batch processed.

At item 465, the application server may convert each event record within the set of event records into a set of converted event records and stream them to a target computing system. For example, item 465 may represent operations, functionality, or steps described with respect to the flowchart of FIG. 3. For example, the identified event records may be converted to converted event records in a manner described with respect to item 320 and streamed to the target computing system in a manner described with respect to item 345.

Figure 5:
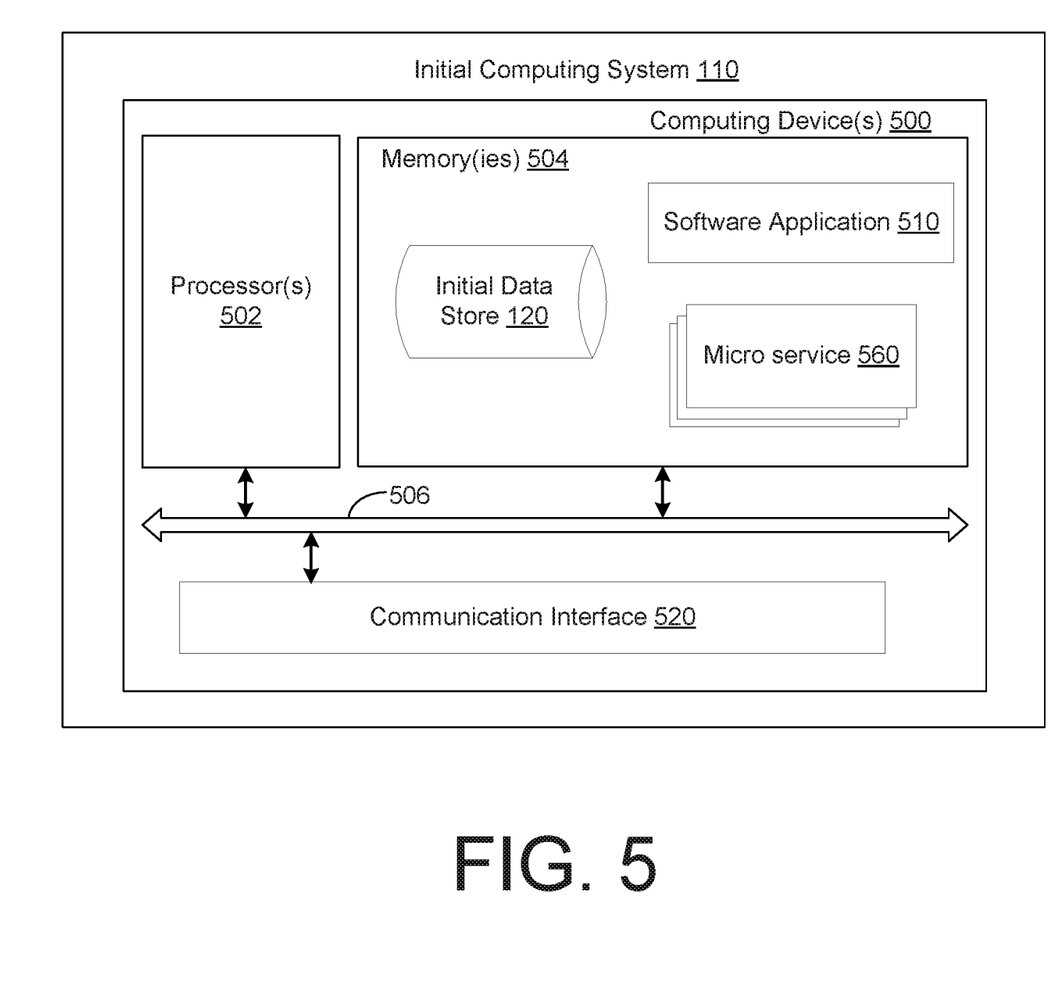
FIG. 5 is a schematic showing an example of an implementation of various embodiments in a computing system.

FIG. 5 is a schematic showing an example of an implementation of various embodiments in an initial computing system 110. The computing system 110 may refer to one or more computing devices 500 with distributed hardware and software to implement the functionality of the computing system 110.

The computing device 500 includes at least one processor circuit, for example, having a processor 502 and memory 504, both of which are coupled to a local interface 506 or bus. Stored in the memory 504 are both data and several components that are executable by the processor 502. For example, the memory 504 may store files, such as, for example, a conversion file 114. The memory may also include the initial data store 120.

Also stored in the memory 504 and executable by the processor 502 is a software application 510. The software application may implement the method 300 of FIG. 3, the method 400 of FIG. 4A and/or the method 450 of FIG. 4B. The software application 510 may launch a virtual machine 112 that carries out various operations described in the present disclosure. Microservices 170 may also reside in memory 504.

It is understood that there may be other applications that are stored in the memory 504 and are executable by the processor 502 as can be appreciated. Where any component discussed herein is implemented in the form of software, any one of a number of programming languages may be employed, such as, for example, C, C++, C #, Objective C, Java®, JavaScript®, Perl, PHP, Visual Basic®, Python®, Ruby, or other programming languages.

Several software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RANI), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 506 may be an appropriate network that facilitates communication between any two of the multiple processors 502, between any processor 502 and any of the memories 504, or between any two of the memories 504, etc. The local interface 506 may couple to additional systems such as the communication interface 520 to coordinate communication with remote systems. Remote systems may include, for example, an authentication server 150, an encryption server 160, and/or other systems.

Although components described herein may be embodied in software or code executed by hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowcharts discussed above show the functionality and operation of an implementation of components within a system such as a software application 510, virtual machine 112, or other software. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 502 in a computer system or other system. The machine code may be converted from the source code, etc. If embodied in hardware, each block may represent a circuit or a number of interconnected circuits to implement the specified logical function(s).

Although the flowcharts show a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowcharts may also comprise software or code that can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any program or application described herein, including the software application 510 or virtual machine 112, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method for streaming event records into a target computing system, the method comprising the steps of:
    executing a Java Virtual Machine (JVM) in a first application server that stores an event record;
    transmitting an authentication certificate to an authentication server to obtain an authentication token;
    transmitting the authentication token to an encryption server to obtain a first encryption key associated with a key pair;
    generating a converted event record according to a conversion file by using predefined schema specified in the conversion file;
    encrypting the converted event record using the encryption key;
    establishing a network connection by the JVM to the target computing system;
    transmitting the converted event record over the network connection, wherein the converted event record is configured to be decrypted using the encryption key received from the encryption server.

2. The method of claim 1, wherein the first application server comprises a mainframe application server and wherein the event record is formatted in a fixed length format.

3. The method of claim 1, wherein the first application server comprises a mainframe application server comprising a Customer Information Control System (CICS) region to execute the JVM.

4. The method of claim 1, wherein the target computing system comprises a Kafka server, and wherein the converted event record comprises at least one schema and at least one topic.

5. The method of claim 1, wherein transmitting the converted event record is performed in response to receiving event data from an application to access the event record.

6. The method of claim 1, wherein the event record is part of a set of event records, wherein transmitting the converted event record is performed in response to receiving a batch process instruction to stream the set of event records from the first application server to the target computing system.

7. The method of claim 1, further comprising instructing, by the JVM, the encryption server to execute a key management service, the key management service generating the key pair comprising the encryption key.

8. The method of claim 1, wherein the authentication server comprises an Active Directory Federation Service (ADFS), wherein the method further comprises transmitting a function ID to the ADFS to obtain the authentication token.

9. The method of claim 1, wherein the conversion file comprises a mapping file, the mapping file configured to map bit ranges of the event record to a corresponding record field.

10. The method of claim 9, wherein the conversion file comprises a configuration file, the configuration file configured to specify a topic for at least one of the record fields.

11. A system comprising:
- a virtual machine executing in a first application server;
- a first data store that stores an event record, the first data store being coupled to the first application server;
- an authentication server configured to transmit an authentication token to the virtual machine in response to receiving an authentication certificate or function identifier;
- encryption server configured to transmit a first encryption key associated with a key pair in response to receiving the authentication token;
- a conversion file used by the virtual machine to generate a converted event record, wherein the converted event record is encrypted using the encryption key;
- a network connection established by the virtual machine to a target computing system; and
- a target data store of the target computing system, the target data store configured to receive the converted event record over the network connection, wherein the converted event record is configured to be decrypted using the encryption key received from the encryption server.

12. The system of claim 11, wherein the first data store comprises a mainframe database and wherein the event record is formatted in a fixed length format.

13. The system of claim 11, wherein the first application server comprises a mainframe application server comprising a Customer Information Control System (CICS) region to execute the virtual machine.

14. The system of claim 11, wherein the target computing system comprises a Kafka server, and wherein the converted event record is associated with at least one schema and at least one topic.

15. The system of claim 11, wherein the converted event record is transmitted to the target data store in response to receiving event data from an application to access the event record.

16. The system of claim 11, wherein the event record is part of a set of event records, wherein the converted event record is transmitted to the target data store in response to receiving a batch process instruction to stream the set of event records from the first data store to a second data store.

17. The system of claim 11, wherein the virtual machine is configured to instruct the encryption server to execute a key management service, the key management service generating the key pair comprising the encryption key.

18. The system of claim 11, wherein the authentication server comprises an Active Directory File System (ADFS).

19. The system of claim 11, wherein the conversion file comprises a mapping file, the mapping file configured to map bit ranges of the event record to a corresponding record field.

20. The system of claim 19, wherein the conversion file comprises a configuration file, the configuration file configured to specify a topic for at least one of the record fields.

* * * * *